(12) United States Patent
Bangs et al.

(10) Patent No.: US 9,018,279 B1
(45) Date of Patent: Apr. 28, 2015

(54) RUBBER-CONTAINING BITUMINOUS MIXTURES AND METHODS FOR MAKING AND USING SAME

(71) Applicants: Polymer Consultants, Inc., Valrico, FL (US); Innovative Polymer Solutions, Inc., Valrico, FL (US)

(72) Inventors: David L. Bangs, Atlanta, GA (US); Peter C. Blyth, Valrico, FL (US)

(73) Assignees: Polymer Consultants, Inc., Valrico, FL (US); Innovative Polymer Solutions, Inc., Valrico, FL (US)

( * ) Notice: Subject to any disclaimer, the term of this patent is extended or adjusted under 35 U.S.C. 154(b) by 93 days.

(21) Appl. No.: 13/705,634

(22) Filed: Dec. 5, 2012

(51) Int. Cl.
*C08J 9/32* (2006.01)
*C08J 3/20* (2006.01)

(52) U.S. Cl.
CPC .......................................... *C08J 3/20* (2013.01)

(58) Field of Classification Search
CPC ........... C10C 3/00; C08L 17/00; C08L 95/00; E01C 7/26; E01C 7/262; E01C 7/265
USPC ............ 521/41, 83; 523/218, 347; 524/59, 71
See application file for complete search history.

(56) References Cited

U.S. PATENT DOCUMENTS

| | | | |
|---|---|---|---|
| 4,203,837 A | 5/1980 | Hoge et al. | |
| 4,437,896 A | 3/1984 | Partanen | |
| 5,385,401 A | 1/1995 | Nath | |
| 5,460,649 A | 10/1995 | Strassman | |
| 5,492,561 A | 2/1996 | Flanigan | |
| 5,501,730 A | 3/1996 | Duong et al. | |
| 5,558,704 A | 9/1996 | Masuda et al. | |
| 5,683,498 A | 11/1997 | Hesp | |
| 5,704,971 A | 1/1998 | Memon | |
| 5,719,215 A | 2/1998 | Liang et al. | |
| 5,936,015 A | 8/1999 | Burns | |
| 6,271,305 B1 | 8/2001 | Rajalingam et al. | |
| 6,444,731 B1 | 9/2002 | Memon | |
| 6,538,060 B2 | 3/2003 | Rajalingam et al. | |
| 6,786,961 B2 | 9/2004 | Honma et al. | |
| 6,786,963 B2 | 9/2004 | Matherly et al. | |
| 6,855,754 B2 | 2/2005 | Takamura et al. | |
| 7,087,665 B2 | 8/2006 | Sylvester et al. | |
| 7,157,508 B2 | 1/2007 | Dean | |
| 7,267,231 B2 | 9/2007 | Gabl | |
| 7,384,468 B2 | 6/2008 | Butler et al. | |
| 7,439,219 B2 | 10/2008 | Scheibel et al. | |
| 7,538,080 B2 | 5/2009 | Scheibel et al. | |
| 7,547,356 B2 | 6/2009 | Partanen | |
| 7,550,631 B2 | 6/2009 | Scheibel et al. | |
| 7,705,068 B2 | 4/2010 | Mellott, II et al. | |
| 7,811,373 B2 | 10/2010 | Partanen et al. | |
| 7,816,446 B2 | 10/2010 | Shahidi et al. | |
| 7,902,277 B2 | 3/2011 | Reinke et al. | |
| 7,910,633 B2 | 3/2011 | Mellott, II et al. | |

FOREIGN PATENT DOCUMENTS

| | | |
|---|---|---|
| WO | WO9317076 A2 | 9/1993 |
| WO | WO2007068990 A1 | 6/2007 |

*Primary Examiner* — Edward Cain
(74) *Attorney, Agent, or Firm* — Meunier Carlin & Curfman, LLC

(57) ABSTRACT

Disclosed are methods for producing rubber-containing bituminous mixtures by pressurizing mixtures of bituminous materials, crumb rubber, and one or more suspension agents with a gas, and then reducing the pressure, creating bubbles of the gas in the mixture. Also disclosed are methods of introducing gas into such mixture by rapid mixing. Mixtures produced by the disclosed methods, such as rubber-containing asphalt mixtures and paving compositions thereof, and their use are also disclosed.

40 Claims, No Drawings

RUBBER-CONTAINING BITUMINOUS MIXTURES AND METHODS FOR MAKING AND USING SAME

BACKGROUND

Over 300 million scrap tires are generated a year in North America. These scrap tires take up large amounts of space in landfills or are illegally dumped, providing breeding grounds for mosquitoes and rodents. Large stockpiles of scrap tires also have the potential for fires that are detrimental to the environment and extremely hard to extinguish.

Fortunately, markets now exist for most of the scrap tires generated each year. The major market for scrap tires, at some 47% of all recovered used tires, is tire derived fuels, which in 2009 consumed some 2,084 thousand tons of all recovered tires. The second largest single market for ground tire rubber ("GTR"), utilizing significantly smaller mesh sizes than that found in tire derived fuels, consumed approximately 31% of the available scrap tires, or some 1,350 thousand tons of all recovered tires per year in 2009. This GTR is incorporated into bituminous (e.g., asphalt) paving material as a cost reduction and performance enhancement additive that consumes over 18 million tires a year.

Approximately 94% of all roads in America are paved and all states are aggressively searching for ways to lower material costs and improve asphalt performance. With twenty one states currently using rubber modified asphalt, GTR containing asphalt is projected to eclipse landscape cover as the number one scrap tire consuming market within the next several years.

Blending GTR with asphalt can produce a pavement with a number of advantages such as longer lasting road surfaces, reduced road maintenance due to lesser cracking and rutting, reduced pavement thickness, lower road noise, and shorter breaking distances. According to the Rubber Pavements Association, a 2.5 cm thick overlay of hot-mix asphalt will consume about 2,000 tires per lane mile with seal coats consuming about 500 tires per lane mile when spray applied. Therefore, using rubber-containing asphalt is an effective way to reduce the problematic stockpiles of scrap tires.

Blending rubber with asphalt can, however, be challenging. Rubber particles are generally insoluble in asphalt and can settle out of the asphalt mixture during storage or transport. Also, blending is often done at high temperatures, which swells the rubber and increases the viscosity of the binder. Reheating or prolonged heating during storage tends to devulcanize the rubber, physically degrading the overall performance properties of the rubber particulate. It can also eliminate the particulate nature of the GTR and lead to loss of the desirable improvements in physical properties and lower costs that can be attained by the use of GTR enhanced asphalt. These phenomena limit the opportunities for using rubber-containing asphalt mixtures, requiring that such mixtures be used within a short period after their manufacture and in the vicinity of the manufacturing facility.

Several methods have been tried to improve the storage and transport stability of rubber-containing asphalt mixtures. For example, light hydrocarbon solvents or highly aromatic, high-boiling mineral oil have been added to such mixtures. These methods are, however, costly and of questionable environmental impact. Other methods devulcanize the rubber with high temperatures and/or adding oxidizers or devulcanization agents. However, such methods are capital intensive and therefore costly, require additional steps, and can use reactive agents. Another strategy for resolving these issues has been to use mobile mixing units that mix the GTR and asphalt on site. Such units are expensive and they may not routinely be available.

It is thus desirable to improve the processes of incorporating rubber into bituminous materials like asphalt. One step processes, implemented at the point of manufacture, that can improve the stability of such mixtures and reduce separation can allow longer storage and transport times. Mixtures with lower costs and greater stability have increased opportunities for use, which ultimately means that the benefits of using these materials can be realized in more locations and that there can be further reductions in the number of scrap tires in landfills.

SUMMARY

In accordance with the purposes of the disclosed materials and methods, as embodied and broadly described herein, the disclosed subject matter, in one aspect, relates to methods for producing rubber-containing bituminous mixtures and the materials produced by such methods. In certain aspects, rubber-containing asphalt mixtures and methods for their production and use are disclosed herein. The methods for producing such rubber-containing bituminous mixtures disclosed herein make use of dissolved gases and suspension agents to improve stability (e.g., reduce settling of rubber from the mixture).

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

The materials, compounds, compositions, and methods described herein may be understood more readily by reference to the following detailed description of specific aspects of the disclosed subject matter, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a crumb rubber" includes mixtures of two or more such crumb rubbers, reference to "an asphalt mixture" includes mixtures of two or more such asphalt mixtures, reference to "the aggregate" includes mixtures of two or more such aggregates, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Further, unless stated otherwise, the term "about" means within 5% (e.g., within 2% or 1%) of the particular value modified by the term "about."

A weight percent (wt. %) of a component, unless specifically stated to the contrary, is based on the weight of the bituminous material (e.g. asphalt). For example, 12 wt. % GTR would mean there is 12% GTR by weight of asphalt.

Reference will now be made in detail to specific aspects of the disclosed materials, compounds, compositions, articles, and methods, examples of which are illustrated in the accompanying examples.

Methods

Disclosed herein are methods for preparing a rubber-containing bituminous mixture that comprise (a) pressurizing a mixture of bituminous material, crumb rubber, and one or more suspension agents with a gas, thereby dissolving at least a portion of the gas into the mixture. The dissolved gas in the mixture can then effervesce (which can be facilitated by reducing the pressure of the mixture). This process provides more stable rubber-containing bituminous mixtures in that there is less settling of rubber in the mixture allowing for longer storage and transport times.

The mixture of bituminous material, crumb rubber, and suspension agent can be provided in various ways but primarily a wet process is used. In the wet process, crumb rubber is blended into the bituminous material by batch blending in which batches of rubber and bituminous material are mixed in production or by continuous blending with a continuous production system (i.e., terminal blending). In one suitable wet procedure, hot asphalt is mixed with crumb rubber and the mixture then is optionally diluted with extender oil. In the wet processes, the suspension agent can be added to the bituminous material before the crumb rubber is added, simultaneous with the crumb rubber, or after the crumb rubber is added.

The mixture of bituminous material, crumb rubber, and suspension agent can be mixed to varying degrees using containers and mixers common in the field. The amount of mixing depends on the viscosity of the mixture, temperature, the type of bituminous material, the type of aggregate, and the amount and size of crumb rubber. In most cases, the mixture is continuously stirred so as to create and maintain a homogeneous dispersion.

The mixture of bituminous material, crumb rubber, and stabilizing agent can be at from about 135° C. to about 200° C., from about 140° C. to about 190° C., from about 150° C. to about 180° C. from about 160° C. to about 170° C., from about 135° C. to about 160° C., or from about 170° C. to about 200° C. In certain aspects, the mixture is at about 150° C. to about 170° C., e.g., at about 163° C. In specific examples, asphalt with 12 wt. % rubber is at about 175° C. and 18 wt. % rubber is at about 190° C. High temperatures, such as those above 200° C. should be avoided. While not wishing to be bound by theory, the reason is that too high a temperature will completely devulcanize the GTR thereby eliminating the benefits of having discrete particles of GTR present to improve the properties of the asphalt.

The mixture of bituminous material, crumb rubber, and stabilizing agent can have a viscosity range, measured by ASTM method D4402, of from about 1 to about 30 poise, from about 2 to about 20 poise, from about 4 to about 15 poise, from about 5 to about 10 poise. In specific examples, the mixtures can have a viscosity of about 2, 4, 6, 8, 10, 12, 14, 16, 18, 20, 22, 24, 26, 28, or 30 poise as measured by ASTM method D4402, where any of the stated values can form an upper or lower end point of a range. In still further examples, mixtures with about 5 wt. % rubber can have a viscosity of from about 4 to about 6 poise, mixtures with about 12 wt. % rubber can have a viscosity of from about 10 to about 30 poise, and mixtures with about 18 wt. % rubber can have a viscosity of from about 150 to about 200 poise as measured by ASTM method D4402. In preferred examples, the mixture can have a viscosity of less than about 30 poise as measured by ASTM method D4402.

The mixing of the bituminous material, crumb rubber, and suspension agents can be performed at from about 10 to about 500 rpm.

The mixture of bituminous material, crumb rubber, and suspension agent is pressurized with a gas to dissolve at least a portion of the gas into the mixture. In most embodiments the gas is a non-oxidizing gas. This can be accomplished by pumping a continuous stream or a batch of the mixture from the mixing container into a vessel into which the compressed gas is introduced. Pressurizing the mixture with the gas is performed so that at least a portion of the gas, up to full saturation, is dissolved into the mixture. Mixing can be used during the pressurization step to facilitate the dissolution of the gas.

The pressurization period depends on the amount and the type of gas that is desired to be dissolved. Longer periods of time, and high pressures, generally dissolve more gas into the mixture. Pressures of from about 135 kPa to about 1.35 MPa, from about 300 kPa to about 750 kPa, or from about 500 kPa to about 1.0 MPa can be used herein. Generally, pressures greater than about 300 kPa are well suited for use herein. These pressures can also be expressed as from about 20 psi to about 200 psi, from about 45 psi to about 110 psi, from about 70 psi to about 145 psi. A pressurization period of from about 1 second to about 1 hour can be used, e.g., 1 second, 5 seconds, 30 seconds, 1 minute, 5 minutes, 10 minutes, 15 minutes, 30 minutes, 45 minutes, or 1 hour can be used, where any of the stated values can form an upper or lower endpoint of a range. In specific examples, the mixture can be pressurized for from about 1 second to 5 minutes, from about 10 seconds to about 10 minutes, from about 10 minutes to about 1 hour, or from about 30 seconds to about 15 minutes.

The gas-containing mixture can then be pumped back into the mixing container, which is at atmospheric pressure. Returning the mixture to the mixing container can involve passing the mixture through a pressure reduction valve. As the gas-containing mixture passes through the pressure reduction valve, the pressure is reduced and the dissolved gas in the mixture is released in the form of tiny bubbles over time (i.e., effervesce). As the bubbles rise they collide with the crumb rubber and the resultant frictional resistance promotes lifting of the rubber in the bituminous material. The suspension agent in the mixture further assists by helping the bubbles to adhere to the rubber.

In another embodiment, gas can be incorporated into the mixture by rapid mixing. Generally mixing the mixture at from about 200 to about 800 rpm will dissolve at least a portion of a gas into the mixture. The rapid mixing can be conducted in air, in which case a portion of air will be incorporated into the mixture. Similarly, the rapid mixing can be conducted under various gases, as mentioned herein, in which case the various gases will be incorporated into the mixture. When gas is incorporated into the mixture by mixing at high speeds, rather than pressurizing the mixture with the gas, the portion of the gas dissolved into the mixture will effervescence at atmospheric pressure, spontaneously, over time.

It is further possible to combine the pressurizing methods with high mixing and thus mix at from about 200 to about 800 rpm, under a pressurized atmosphere of gas. This combined process can increase the amount of dissolved gas and/or reduce the processing times needed to dissolve a given portion of gas into the mixture.

The disclosed methods can be performed in a stationary facility where the mixing of materials and dissolving of gas are performed away from the site where the road is being laid. It is also possible to perform the disclosed methods in a mobile unit, which can be positioned at various locations at or near where the road is being laid. One example of a mobile unit is a tank wagon that contains tanks for the bituminous material, crumb rubber, suspension agents, gas, and optional other additives, as well as a mixing tank and pressurizing chamber.

Bituminous Materials

In the disclosed compositions and methods, various bituminous materials can be used. Examples of suitable bituminous materials for use herein include, but are not limited to, asphalt, tar, pitch, etc. A bituminous material includes, but is not limited to, various hydrocarbon mixtures that occur naturally or that are obtained synthetically, and that are used for surfacing roads or for waterproofing. Chemically, bituminous materials are complex aggregations of rather large aliphatic and cyclic hydrocarbon molecules.

Asphalt is a bituminous material suitable for use herein. Asphalts are highly complex materials containing both unsaturated and saturated aliphatic and aromatic compounds with up to a 150 carbon atoms. The composition will vary depending on the source and refining methods of the crude oil. Many of the compounds in asphalt contain oxygen, nitrogen, sulfur and other heteroatoms. Asphalt typically contains about 80% by weight of carbon, 10% hydrogen; up to 6% sulfur; small amounts of oxygen and nitrogen; trace amounts of metals such as iron, nickel, and vanadium. The molecular weights of the varied compounds in asphalt range from several hundred to many thousands.

The compounds are classified as asphaltenes or maltenes according to their solubility in hexane or heptanes. Asphaltenes are high molecular weight species that are insoluble in these solvents. Maltenes have lower molecular weights and are soluble. Asphalt normally contains between 5 and 25% by weight of asphaltenes and can be regarded as colloids of asphaltene micelles dispersed in maltenes.

Representative asphalts suitable for use herein include native rock, lake asphalts, petroleum asphalts, air-blown asphalts, sulfur-treated asphalt, reclaimed asphalts, cracked asphalts, or residual asphalts. The term "asphalt" also includes asphalt binder and asphalt cement.

Crumb Rubber

"Crumb rubber" refers to rubber that is used as a modifier in bituminous materials such as asphalt. Any crumb rubber can be used in the disclosed methods and compositions. Crumb rubber generally contains a variety of rubber polymers, including styrene-butadiene rubber (SBR), styrene-butadiene-styrene rubber (SBS), natural rubber and its synthetic analog (cis-polyisoprene), cis-polybutadiene, butyl rubber (copolymer of isobutylene and isoprene), polybutylene, EPDM rubber, polychloroprene (neoprene), nitrile rubber (acrylonitrile butadiene), polyacrylonitrile, and the like. Often crumb rubber comprises predominantly styrene-butadiene rubber. The crumb rubber can either be synthetic or natural rubber particles. The crumb rubber can be either vulcanized or devulcanized, or mixtures of both; however, the best results are obtained when the crumb rubber is not devulcanized or oxidized. Liquefied crumb rubber should not be used. While not wishing to be bound by theory, liquefied crumb rubber will eliminate the benefits of having discrete particles of GTR present to improve the properties of the asphalt.

Size

Crumb rubber of varying particle sizes can be used herein. In most examples, crumb rubber with a sieve designation of greater than or equal to about 4 mesh (i.e., the crumb rubber particles can fit through sieve opening of less than or equal to about 4760 μm) can be used herein. In other examples, crumb rubber with a sieve designation of from about 4 to about 240 mesh, from about 10 to about 170 mesh, from about 14 to about 80 mesh, from about 1 to about 30 mesh, from about 10 to about 80 mesh, or from about 80 to about 240 mesh can be used. Specific examples, included crumb rubber with a sieve designation of about 4 mesh, about 10 mesh, about 14 mesh, about 30 mesh, about 80 mesh, or about 170 mesh can be used. In general, the higher the mesh number used the higher the viscosity of the mixture. So using an 80 mesh crumb rubber particles would result in a mixture with higher viscosity than a 30 mesh crumb rubber particles.

The correlation of sieve designations (mesh size) to sieve opening size is provided below. Any of the mesh or corresponding sieve opening values can form an upper or lower endpoint of a range.

| Mesh | Sieve opening (μm) |
| --- | --- |
| No. 4 | 4760 |
| No. 5 | 4000 |
| No. 6 | 3360 |
| No. 7 | 2830 |
| No. 8 | 2380 |
| No. 10 | 2000 |
| No. 12 | 1680 |
| No. 14 | 1410 |
| No. 16 | 1190 |
| No. 18 | 1000 |
| No. 20 | 841 |
| No. 25 | 707 |
| No. 30 | 595 |
| No. 35 | 500 |
| No. 40 | 420 |
| No. 45 | 354 |
| No. 50 | 297 |
| No. 60 | 250 |
| No. 70 | 210 |
| No. 80 | 177 |
| No. 100 | 149 |

-continued

| Mesh | Sieve opening (μm) |
| --- | --- |
| No. 120 | 125 |
| No. 140 | 105 |
| No. 170 | 88 |
| No. 200 | 74 |
| No. 230 | 63 |

Methods for Obtaining

Crumb rubber can be obtained commercially from a variety of sources. The major source of crumb rubber is from scrap tires and is referred to as ground tire rubber (GTR). In general, GTR is produced by first shredding tires down to about 0.15 $m^2$ pieces in a shear tire shredder with two counter, rotating shafts. The tire shreds are then further reduced in size by using either an ambient or cryogenic system. In an ambient system, the shreds are fed at ambient temperature (i.e., at or above ordinary room temperature) into one or more granulators, fitted with screens that determine the size of the output. Steel is removed from the resulting material by magnets and fiber is removed by aspiration and sifting so that only rubber particles remain.

Crumb rubber can also be produced by processing the shredded or granulated rubber through one or more "cracker mills." These mills have two counter-rotating corrugated rolls placed very close together that "cracks" and tears the rubber into smaller particles as it passes through.

Another ambient method uses solid-state shear extrusion (SSSE) pulverization to obtain a fine rubber powder. In an SSSE process, rubber granulates are subjected to compression shear strain in a single screw extruder. The screw design provides a decreasing channel depth to exert compression, while the relative movement of the screw with respect to the barrel wall ensures the shearing of the granulates. Cooling elements remove the heat dissipated during pulverization to reduce or eliminate agglomeration of the fine particles and the viscoelastic relaxation of the stresses at elevated temperatures. The particles produced by SSSE processes generally have a very high surface area compared to those produced by other processes, due to their irregular shape. In addition, the produced particles are partially devulcanized due to high shear and compression forces applied during the pulverization process.

In a cryogenic system, the tire shreds are super-cooled using liquid nitrogen. The cold rubber, now extremely brittle, is processed through a hammer mill, which shatters the rubber into small particles. The output is dried and classified into specific gradations. Smaller particles can usually be produced with the cryogenic process than with an ambient system. It requires fewer pieces of equipment than the ambient system and energy and maintenance costs may be less. A drawback of the cryogenic process is the cost of liquid nitrogen. As such, the cryogenic process is generally more expensive than other methods.

In the disclosed methods and compositions, any crumb rubber can be used, e.g., ambient ground crumb rubber, ambient cracker milled crumb rubber, ambient SSSE crumb rubber, or cryogenic crumb rubber. The cryogenic crumb rubber exhibits a certain regularity of shape when examined by scanning electron microscope (SEM) techniques and reveals particles having generally planar surfaces of relatively low surface area, as might be expected from the fracturing of the cryogenically frozen crystalline tire rubber. In contrast, ambient processed (e.g., shredded, cracker milled or conventionally ground) crumb rubber particles are irregular in appearance with extended tendrils resulting from the pulling apart and shredding of the rubber structure and possess a much higher surface area as compared to the particles produced by the cryogenic process. The irregular texture of such rubber particles also results in a higher reaction rates, surface to volume ratio's, increases viscosity and provides for longer storage stability. Glassy, angular cryogenically ground rubber particulate has a demonstrated slower reaction rates, lower surface to volume ratio's, produces lower viscosities and is more prone to settling when blended with asphalt. So in the disclosed methods and compositions, ambient ground crumb rubber is well suited, and ambient cracker milled crumb rubber is very well suited. Cryogenically ground rubber can be used, but is less preferred than ambient ground rubber. Further, crumb rubber that is swollen from the application of solvents or heat, is preferred over un-swollen crumb rubber.

Amount

The amount of crumb rubber used in the disclosed methods and compositions can vary. The precise amount will depend on the particular requirements of the material in accordance with its intended use. In most cases, best results will be obtained when the crumb rubber comprises from about 3% to about 30% by weight of the bituminous material. In further examples, the crumb rubber can comprise from about 5% to about 25%, from about 10% to about 20%, from about 15% to about 18%, from about 10% to about 15%, from about 12% to about 18%, or from about 20% to about 30%, by weight of the bituminous material. In one specific example, the crumb rubber comprises from about 10 to about 18% by weight of the bituminous material.

Gases

The disclosed compositions and methods make use of dissolved gases to improve the stability of the rubber-containing bituminous mixtures. Various gases can be used. The most suitable gases are those that are non-oxidizing and relatively inert. Examples of such gases include nitrogen, helium, neon, argon, krypton, xenon, carbon dioxide, carbon monoxide, $NO_2$, $NO$, and $NH_3$. It is also possible to use oxygen or air, but these can lead to unwanted oxidation and can only be used under specialized state approved exemptions. Air-blown asphalt, while common in roofing applications, is typically not allowed in paving applications.

While not wishing to be bound by theory, it is believed that the dissolved gases will, upon depressurization or spontaneously, begin to form tiny bubbles that can contact the crumb rubber and suspend it in the bituminous material. Crumb rubber with irregular shapes and extended tendrils, such as ambient ground and cracker-milled rubber, have large surface to volume ratios and combine with the gas bubbles to the greatest extent. As such, the disclosed processes produce a rubber-containing bituminous material with tiny gas bubbles throughout the mixture. Different types of gases will dissolve at different rates, reach different saturation percentage points, and evolve as bubbles from solution at different rates. These differences provide additional control mechanisms for the suspension process.

The use of dissolved gas in the disclosed methods and composition is not the same as the use of air to make "air-blown" asphalt mixtures. Air blown asphalts involve an exothermic oxidation reaction that occurs once the air is contacted with the asphalt, yielding a harder, more viscous, less volatile, and less temperature-susceptible product than the asphalt used as the feedstock to the disclosed processes. Oxidized bitumen's grades are typically suited for industrial applications like roofing, flooring, mastics, pipe coatings, electrical applications to name a few. The air facilitates the devulcanization of the rubber component of the mixture and increases asphalt viscosity. Specifically, the rubber is devulcanized by vigorous heating (e.g., five hours at 200-260° C.), sometimes in the presence of free radical initiators or devulcanizing accelerators, while air is blown through. Notably, while the air is blown into the mixture it is not blown at pressures necessary to dissolve a significant portion of the air into the mixture. The air is a reactant. The result is that the rubber component of the mixture is devulcanized, broken down, and heavily oxidized. This process produces a mixture sometimes referred to as "air-blown" asphalt. While air-blown asphalts have improved rubber dispersibility, they possess poor long-term aging and fatigue properties and impart an undesirable brittleness to the asphalt matrix. So air blown asphalts are distinguishable from the compositions and methods disclosed herein in that they contain no dissolved gas or gas bubbles (or at most insignificant amounts) and/or devulcanized (or at least partially devulcanized) rubber.

Amount

The amount of gas that can be dissolved in the rubber-containing bituminous mixtures can vary. Generally, the lower the temperature and higher the pressure of the mixture, and the greater the mixing, the more gas that can be dissolved. It can be desirable to dissolve large amounts of gas in the mixture (e.g., saturate, or close to saturate, the mixture with dissolved gas) for uses where longer storage and transport times are needed. In other occasions, less dissolved gas can be used. Very high temperatures should be avoided, however, since they can degrade the crumb rubber and/or bituminous material. The solubility of different gases in asphalt follows Henry's Law which states that "the amount of gas dissolved in a fluid is proportional with the pressure of the system." The amount of dissolved gas present in the rubber-containing bituminous mixture is dependent upon application time and pressure and will vary from about 1 mg/L to about 500 mg/L of the mixture. For example, the amount of dissolved gas present in the rubber-containing bituminous mixture can be from about 50 to about 450 mg/L, from about 100 to about 400 mg/L, from about 150 to about 350 mg/L, from about 200 to about 300 mg/L, from about 1 to about 250 mg/L, or from about 200 to about 500 mg/L of the mixture.

Suspension Agent

The disclosed compositions and methods can also use one or more suspension agents to aid the suspension of the crumb rubber in the bituminous material. Suitable suspension agents are amine based surfactants, for example polymeric amines (i.e., a polymer that comprises one or more amine groups). Particularly useful polymeric amines are polyether amines. Polyether amines contain primary amino groups attached to the terminus of a polyether backbone. The polyether backbone is typically based either on propylene oxide (PO), ethylene oxide (EO), or mixed EO/PO. In one aspect, the polyether amine can be a polyoxyalkyleneamines. A series of commercially available polyether amines that are well suited for use herein are amine-terminated polyethoxylates known in the trade as JEFFAMINES™ and sold by Huntsman Performance Products (Salt Lake City, Utah). These compounds are mainly derived from polyethylene glycol and mixtures of polyethylene glycol and polypropylene glycol where the glycols are aminated directly with ammonia and a catalyst. These are called JEFFAMINE D™ and JEFFAMINE ED™ series. A complex mixture of the JEFFAMINES™ series is the T series and is based on either trimethylolpropane or glycerine and thus has three ammonia terminated ethoxy/propoxy branches radiating from the glycerin or trimethylolpropane core. JEFFAMINES™ can have mono amines, diamines, triamines, and tetra amines and are available in a variety of molecular weights, ranging up to 5,000. Any of these compounds can be used herein; although, JEFFAMINE XTJ616™ and blends of JEFFAMINE 5000™ and JEFFAMINE 403™ are very well suited. A particularly complex amine is JEFFAMINE 616™ which is based on a pentaerythritol core with four branches and is very well suited for the compositions and methods herein. Polyphenyl based amines can also be used.

Other polyether amines can be prepared and used herein. For example, polyols can be modified via epichlorohydrin to form a polyol bis-halohydrin, followed by reaction with ammonia or an amine to form repeating networks of amino polyols. This process results in formation of a complex polymerized mixture containing multiple polyols linked randomly via the reactive halohydrin.

Other polymeric amines, which can be obtained commercially or can be prepared by methods known in the art, and that can be used herein include, but are not limited to, polyvinyl amine and polyalkyleneimines like polyethyleneimine. Still further examples of polymeric amines are polyamides that are prepared by the condensation of a diamine monomer with a diacid or diester monomer. Such polyamides can be obtained commercially. Alternatively, polyamides can be prepared by self condensation of a monomer containing an amine and an acid or ester functional group, or through a ring opening reaction of a cyclic amide (i.e., lactam) such as caprolactam.

Further examples of suitable suspension agents include polymeric alcohols (i.e., a polymer that comprises one or more hydroxyl groups), such as polyvinyl alcohol, which is commercially available or can be prepared by the hydrolysis of polyvinyl acetate.

It is also possible to use various surfactants as suspension agents herein. Surfactants (in both aqueous or non-aqueous form) can, when incorporated into a bituminous material at levels as low as about 0.05 wt. % provide sufficient lubrication of the material so that aggregate can be adequately coated, paved, and compacted. Non-aqueous surfactants have also been incorporated into such materials to provide improved moisture resistance. Other exemplary surfactants that can be used include naturally occurring compounds and more commonly synthesized chemical compounds from three categories of surfactants: detergents, wetting agents, and emulsifiers.

Surfactants that can be used herein can be grouped into four classifications: i) anionic surfactants including, but not limited to, fatty acids (e.g., saturated and unsaturated fatty acids), fatty acid pitch (e.g., stearic acid pitch), and fatty acid derivatives (e.g., fatty acid esters and fatty acid sulfonates), and organo phosphates (e.g., alkyl phosphates); ii) cationic surfactants including, but not limited to, alkyl amines, alkyl quaternary ammonium salts, heterocyclic quaternary ammonium salts, amido amines, and non-nitrogenous sulfur or phosphorous derivatives; iii) amphoteric surfactants including, but not limited to, amino acids, amino acid derivatives, betain derivatives (e.g., alkylbetains and alkylaminobetains), imidazolines, imidazoline derivatives; and iv) nonionic surfactants including, but not limited to, fatty acid esters (e.g., SPAN™ or TWEEN™ surfactants), surfactants with ether links (e.g., alkylphenol-polyoxeythylenes and polyoxyethylenated alcohols), surfactants with amide groups (e.g., alkylamides, mono and diethanolamides and their derivatives), alkylenated oxide copolymers and polyoxyethyleneated mercaptans. One exemplary surfactant is an ethoxylated tallow diamine surfactant.

In some specific examples, when lower crumb rubber amounts are used it is advantageous to use a combination of a multi-functional amine such as JEFFAMINE 616™ and a peroxide catalyzed high molecular weight bisphenol A fumarate unsaturated polyester resin.

Amount

The suspension agent can be used in an amount in the range of from about 0.05% to about 5.0%, from about 0.1% to about 4.0%, or from about 1.5% to about 3%, from about 0.05% to about 2.5%, or from about 3% to about 5% by weight of the bituminous material. In some specific examples, the suspension agents can be used in an amount of about 0.05%, 0.1%, 0.5%, 1.0%, 1.5%, 2.0%, 2.5%, 3.0%, 3.5%, 4.0%, 4.5%, or 5.0% by weight based on the weight of the bituminous material, where any of the status values can form an upper or lower endpoint of a range.

Fiber

In optional embodiments, the mixture can also include added fiber. The level of residual ground fiber from the tires themselves can aid the suspension of the rubber. For example, adding a small quantity (e.g., about 0.25% by weight of bituminous material) of the finely ground fiber (e.g., about 30 mesh), settling of the crumb rubber is further reduced but the viscosity of the mixture increases only a small amount. Fiber can generally be added in an amount of from about 0.05% to about 1%, from about 0.1% to about 0.75%, from about 0.25% to about 0.5%, or from about 0.05% to about 0.5% by weight of the bituminous material. Fiber sizes that can be used are from about 4 mesh to about 80 mesh, from about 10 mesh to about 30 mesh, from about 4 mesh to about 14 mesh, or from about 14 mesh to about 60 mesh. In some examples the fiber material can be synthetic organic fibers as disclosed in U.S. Pat. No. 5,460,649, which is incorporated by reference herein in for its teaching of fibers, including, olefins, polyesters, acrylics, nylons, rayons, acetates, aramids, polyurethanes, and elastomers, and their use in asphalt compositions. Natural fibers made of cellulose can also be used.

Aggregate

The bituminous materials, crumb rubber, and suspension agents, and optional fiber, can, after the gas effervesces, be combined with a variety of aggregate material. Any aggregate suitable for use in road construction or related applications can be used. Either hydrophilic or hydrophobic aggregate can be used. Suitable aggregate can include various mineral materials, such as cinders or slags. Typically an aggregate is of natural origin, such as sand, rock, or the like which is common to the localities where the roads are being built; for example, limestone, dolomite, silica, sedimentary, metamorphic, or igneous rocks of various kinds are regularly used in road construction or related applications. Other types of aggregate, such as gravel, granite, trap rock, sandstone, etc., can also be used. Aggregates referred to as "mineral aggregate" is also suitable. The aggregate can be present in a wide variety of amounts but generally is used in from about 90% to about 95%, from about 92% to about 94%, or from about 93% to about 95% by weight of the final paving composition. In many cases the amount of aggregate is about 93.5% by weight of the final paving composition, though the exact amount varies depending on the particular regulations of a given jurisdiction.

Additional Materials

Various additives can be added to the mixture in amounts of from about 0.05% to about 5.0%, from about 0.1% to about 4.0%, or from about 1.5% to about 3%, from about 0.05% to about 2.5%, or from about 3% to about 5% by weight of the bituminous material.

Waxes can also be used herein. Waxes such as SASOBIT™ wax (Sasol North America Inc.) and montan wax (Strohmeyer and Arpe, N.J.) are usually used to lubricate the paving mixtures. Other suitable waxes include paraffin and non-paraffin waxes. Paraffin waxes include, but are not limited to, petroleum, petroleum-derived and refined waxes (slack wax and refined macrocrystalline wax) while non-paraffin waxes include, but are not limited to, natural waxes (e.g., animal, vegetable, and mineral waxes such as beeswax and carnuaba wax), modified natural waxes (e.g., brown coal derivatives such as montan wax and mineral oil derivatives), partial synthetic waxes (e.g., acid waxes, ester waxes, amide waxes, alcohol waxes and oxidized polyethylene waxes), and full synthetic waxes (e.g., Fischer-Tropsch waxes and polyethylene waxes). Such waxes can be used in amount of from about 0.05% to about 5.0% but in general are used at less than about 1.5 wt. % of the bituminous material.

Viscosity modifiers (VMS), dispersant viscosity modifiers (DVMS), and additives containing viscosity modifiers or dispersant viscosity modifiers, as well as extrusion processing aids, molding processing aids, polyolefins, or sulfur, can be used in the disclosed compositions and methods. Such additives include, but are not limited to, VMS and DVMS used in engine lubricating oils (e.g., polyisobutylenes, olefin copolymers, hydrogenated styrene-diene copolymers, styrene maleate copolymers, polymethacrylates, olefin-graft PMA polymers and hydrogenated polyisoprene star polymers) and products containing VMS and DVMS such as the residual bottoms from refined recycled engine lubricating oils; extrusion processing aids; molding processing aids (e.g., high trans content polyoctenamer reactive polymers); polyolefins, ethylene vinyl acetates; acrylic polymers; silicones; and elemental sulfur or sulfur derivatives (e.g., sulfur impurities used in fuels to provide lubrication properties). One type of additive that can be used are asphaltene and soot suspension agents, more commonly known as polybutadiene reacted succinic anhydrides (PIBSA), acids and esters and phenol based polyamines. These additives can be used in amounts as noted above.

Phosphoric acids or their derivates are also another class of additives that can, when incorporated into an asphalt mixtures at levels as low as from about 0.2 to about 1.0 wt. % provide lubrication of the asphalt mixture. Exemplary phosphoric acids include polyphosphoric acid (PPA) and superphosphoric acid (SPA). Phosphoric acid derivatives can be used in an amount of from about 0.1% to about 1.0%, from about 0.1% to about 0.5 wt %, or from about 0.5% to about 1.0% by weight of the mixture.

Further materials that can be used herein include reclaimed asphalt pavement (RAP), reclaimed asphalt shingles (RAS), organic and inorganic fibers such as polyolefin, cellulosic and mineral fibers, heavy metal soaps such zinc stearate to enhance adhesion, compounds containing Group IIA (e.g., Be, Mg, Ca, Sr, Ba), Group IIIA (e.g., Sc, La), Group IIIB (e.g., Al, Ga, In), copper, zinc, cadmium, manganese, iron, cobalt and nickel salts, and/or diamides derived from polyamines and polycarboxylic acids that serve as improved anti-strip agents.

Inorganic salts such as calcium chloride, sodium chloride and potassium chloride can also be added to improve the workability of the mixture. The mixture can also contain water-soluble polymers such as carboxymethyl cellulose and hydroxyethyl cellulose. Moreover, the mixture can contain polyphenol compounds such as tannin for the purpose of improving adhesion between aggregates and asphalt.

Other materials that can be added include mineral fillers, clays and clay-like materials, fumed silica, and talc.

Compositions

Also disclosed are compositions prepared by the methods disclosed herein. The compositions can contain any of the bituminous materials and crumb rubber disclosed herein. Further, the compositions contain dissolved gas at from about 1 mg/L to about 500 mg/L, from about 50 to about 450 mg/L, from about 100 to about 400 mg/L, from about 150 to about 350 mg/L, from about 200 to about 300 mg/L, from about 1 to about 250 mg/L, or from about 200 to about 500 mg/L. Further from 0.05 to about 5.0 wt. % of the suspension agents are disclosed herein.

In some specific examples disclosed are mixtures that comprise bituminous material, crumb rubber, one or more suspension agents, and from about 1 mg/L to about 500 mg/L of dissolved gas. In other specific examples, disclosed are mixtures that comprise bituminous material, from about 14 to about 18% crumb rubber by weight of the bituminous material, and one or more polymeric amine suspension agents. The mixture can contain from about 3% to about 30%, or from about 10% to about 18%, crumb rubber by weight of the bituminous material. The crumb rubber can comprise ambient ground crumb rubber. The crumb rubber can have a sieve designation of from about 4 mesh to about 240 mesh, or from about 10 mesh to about 80 mesh. If gas is present, the gas in the mixture have one or more gases comprised of nitrogen, helium, neon, argon, krypton, xenon, carbon dioxide, carbon monoxide, $NO_2$, NO, or $NH_3$. The gas can be oxygen or air. The suspension agent can comprise a polymeric amine. The polymeric amine can comprise a polyoxyalkyleneamines, polyvinyl amine, polyalkyleneimine, or polyamides. The suspension agent can comprise bis phenol A fumarate. The suspension agent can be from about 0.05% to about 5.0% by weight of the bituminous material. The mixture can further comprise fiber. The fiber can be present in the mixture at from about 0.05 to about 1.0% by weight of the bituminous material.

Further the compositions can be substantially free (e.g., less than 1 wt. %) of carbonaceous solid waste, vulcanizing accelerators, polyoctenamer, and polyurethane. Also, in many examples, the disclosed compositions do not contain devulcanized rubber crumb or devulcanizing catalysts like selenium.

The disclosed compositions can be storage stable with minimal visible separation of the crumb rubber particles from the bituminous material after 48 hours without mixing. Visible separation is measured according to ASTM method D7173, which is run on a temperature continuum from 30° C. to 200° C. This test places a ball bearing on a small circle of solidified asphalt mix and immerses it in a hot bath. The temperature is then raised and the temperature at which the ball falls through the asphalt circle is noted and compared to a standard. The difference between the two temperatures is reported as degrees Centigrade. While each State is different, ideally a 4 degree or less separation is preferred. Some States will allow as much as 7 degrees of separation as a passing score. Excessive degrees of separation are considered a failure.

The disclosed compositions can be used, for example, as paving or roofing materials.

EXAMPLES

The following examples are set forth below to illustrate the methods, compositions, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

All percentages are as a percent of the neat asphalt in the formulation.

Example 1

Use of Nitrogen Gas and Blend of JEFFAMINE 403™ and JEFFAMINE 5000™

506 g of neat 67-22 grade asphalt at 180° C. was mixed with 13.64% by weight 30 mesh ground tire rubber (GTR), 0.25% by weight ground 30 mesh fiber derived from recycled tires, 0.18% by weight JEFFAMINE 403™ and 0.18% by weight JEFFAMINE 5000™. The mixture was stirred at 200 rpm and held at 177° C. for 60 minutes. The resultant mixture was then subjected to nitrogen gas with stirring at 483 kPa for 35 seconds and then poured into cigar tubes and held at 163° C. for up to 48 hours. Examination of the tubes after 48 hours showed no significant GTR separation.

Example 2

Use of Nitrogen Gas and Blend of JEFFAMINE 403™ and JEFFAMINE 5000™

504 g of neat 67-22 grade asphalt at 177° C. was mixed with 18% by weight 30 mesh GTR, 0.18% by weight JEFFAMINE 403™ and 0.18% by weight JEFFAMINE 5000™. The mixture was stirred at 200 rpm and held at 177° C. for 60 minutes. The resultant mixture was then subjected to nitrogen gas with stirring at 483 kPa for 35 seconds and then poured into cigar tubes and held at 163° C. for up to 48 hours. Examination of the tubes after 48 hours showed no significant GTR separation.

Example 3

Use of Nitrogen Gas, Raffinate Diluent and Blend of JEFFAMINE 403™ and JEFFAMINE 5000™

420 g of neat 64-16 grade asphalt at 202° C. was mixed with 18.5% by weight 10-20 mesh GTR, 2.5% by weight hydrocarbon raffinate as diluent, 0.15% by weight JEFFAMINE 403™ and 0.15% by weight JEFFAMINE 5000™. The mixture was stirred at 200 rpm and held at 177° C. for 60 minutes. The resultant mixture was then subjected to nitrogen gas with stirring at 483 kPa for 30 seconds and then poured into cigar tubes and held at 163° C. for up to 48 hours. Examination of the tubes after 48 hours showed no significant GTR separation.

Example 4

Use of Nitrogen Gas, VIPEL 282™ Bisphenol A Fumarate Unsaturated Polyester Resin and JEFFAMINE 616™

400 g of 67-22 grade asphalt at 185° C. was mixed with 12% by weight 30 mesh GTR, 0.25% by weight ground 30 mesh fiber derived from recycled tires, and 0.25% JEFFAMINE™ 616. This mixture was stirred at 200 rpm and held at 177° C. for 45 minutes at which time 0.5% by weight of VIPEL 282™ was added along with 0.1% by weight organic peroxide TRIGONOX 29-C75™ to initiate the polymerization reaction. The resultant mixture was stirred an additional 15 minutes at 177° C. and then subjected to nitrogen gas with stirring at 483 kPa for 60 seconds. Samples were poured into cigar tubes and held at 163° C. for up to 48 hours. Examination of the tubes after 48 hours showed no significant GTR separation.

Example 5

Use of Blend of Argon and Helium Gas, VIPEL 282™, Epoxidized Soybean Oil (ESO) and JEFFAMINE 616™

406 g of 67-22 grade asphalt at 179° C. was mixed with 12% by weight 30 mesh GTR, 0.25% by weight ground 30 mesh fiber derived from recycled tires, 0.5% by weight ESO and 0.15% by weight JEFFAMINE™ 616. This mixture was stirred at 200 rpm and held for 45 minutes at which time 0.35% by weight VIPEL 282™ was added along with 0.085% by weight TRIGONOX 29-C75™ to initiate the polymerization reaction. The resultant mixture was stirred an additional 15 minutes at 177° C. and then subjected with stirring to first, argon gas at 483 kPa for 20 seconds, followed by helium gas at 483 kPa for 20 seconds. Samples were poured into cigar tubes and held at 163° C. for up to 48 hours. Examination of the tubes after 48 hours showed no significant GTR separation.

The materials and methods of the appended claims are not limited in scope by the specific materials and methods described herein, which are intended as illustrations of a few aspects of the claims and any materials and methods that are functionally equivalent are within the scope of this disclosure. Various modifications of the materials and methods in addition to those shown and described herein are intended to fall within the scope of the appended claims. Further, while only certain representative materials, methods, and aspects of these materials and methods are specifically described, other materials and methods and combinations of various features of the materials and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method for preparing a rubber-containing bituminous mixture, comprising:
   a. pressurizing a mixture comprising bituminous material, crumb rubber, and one or more suspension agents with a gas, wherein the gas is nitrogen, helium, neon, argon, krypton, xenon, carbon dioxide, carbon monoxide, $NO_2$, NO, or $NH_3$, thereby dissolving at least a portion of the gas into the mixture; and
   b. reducing the pressure of the mixture, thereby creating bubbles of the gas in the mixture.

2. The method of claim 1, wherein the bituminous material comprises asphalt.

3. The method of claim 1, wherein the mixture comprises from about 3% to about 30% crumb rubber by weight of the bituminous material.

4. The method of claim 1, wherein the mixture comprises from about 10% to about 20% crumb rubber by weight of the bituminous material.

5. The method of claim 1, wherein the crumb rubber comprises ambient ground crumb rubber.

6. The method of claim 1, wherein the crumb rubber comprises ambient cracker milled crumb rubber.

7. The method of claim 1, wherein the crumb rubber has a sieve designation of from about 4 mesh to about 240 mesh.

8. The method of claim 1, wherein the crumb rubber has a sieve designation of from about 10 mesh to about 80 mesh.

9. The method of claim 1, wherein the amount of gas dissolved in the mixture is from about 0.5 mg/L to about 500 mg/L of the mixture.

10. The method of claim 1, wherein the mixture is pressurized at from about 135 kPa to about 1.35 MPa.

11. The method of claim 1, wherein the mixture is at a temperature of from about 135° C. to about 200° C.

12. The method of claim 1, wherein the mixture is at a temperature of from about 150° C. to about 170° C.

13. The method of claim 1, wherein the suspension agent comprises a polymeric amine.

14. The method of claim 13, wherein the polymeric amine comprises a polyoxyalkyleneamines, polyvinyl amine, polyalkyleneimine, or polyamides.

15. The method of claim 1, wherein the suspension agent comprises a polyamine and bisphenol A fumarate.

16. The method of claim 1, wherein the suspension agent is present at from about 0.05% to about 5.0% by weight of the bituminous material.

17. The method of claim 1, further comprising adding a fiber to the mixture.

18. The method of claim 17, wherein the fiber is present at from about 0.05% to about 1.0% by weight of the bituminous material.

19. The method of claim 1, further comprising adding aggregate to the mixture.

20. A mixture, comprising: bituminous material, crumb rubber, one or more suspension agents, and from about 1 mg/L to about 500 mg/L of dissolved gas, wherein the gas is nitrogen, helium, neon, argon, krypton, xenon, carbon dioxide, carbon monoxide, $NO_2$, NO, or $NH_3$.

21. The mixture of claim 20, wherein the crumb rubber is from about 3% to about 30% by weight of the bituminous material.

22. The mixture of claim 20, wherein the crumb rubber is from about 10% to about 20% by weight of the bituminous material.

23. The mixture of claim 20, wherein the crumb rubber comprises ambient ground crumb rubber.

24. The mixture of claim 20, wherein the crumb rubber has a sieve designation of from about 4 mesh to about 240 mesh.

25. The mixture of claim 20, wherein the crumb rubber has a sieve designation of from about 10 mesh to about 80 mesh.

26. The mixture of claim 20, wherein the suspension agent comprises a polymeric amine.

27. The mixture of claim 26, wherein the polymeric amine comprises a polyoxyalkyleneamines, polyvinyl amine, polyalkyleneimine, or polyamides.

28. The mixture of claim 20, wherein the suspension agent comprises bis phenol A fumarate.

29. The mixture of claim 20, wherein the suspension agent is from about 0.05% to about 5.0% by weight of the bituminous material.

30. The mixture of claim 20, further comprising fiber.

31. The mixture of claim 30, wherein the fiber is present in the mixture at from about 0.05 to about 1.0% by weight of the bituminous material.

32. The mixture of claim 20, wherein the mixture is substantially free of carbonaceous solid waste, vulcanizing accelerators, polyoctenamer, and polyurethane.

33. A method for preparing a rubber-containing bituminous mixture, comprising mixing from about 300 to about 800 rpm a mixture comprising bituminous material, crumb rubber, and one or more suspension agents, to thereby dissolve from about 1 mg/L to about 500 mg/L of gas into the mixture.

34. A mixture, comprising: bituminous material, from about 14 to about 18% crumb rubber by weight of the bituminous material, and one or more polymeric amine suspension agents.

35. The mixture of claim 34, wherein the crumb rubber comprises ambient ground crumb rubber.

36. The mixture of claim 34, wherein the crumb rubber has a sieve designation of from about 4 mesh to about 240 mesh.

37. The mixture of claim 34, wherein the crumb rubber has a sieve designation of from about 10 mesh to about 80 mesh.

38. The mixture of claim 34, wherein the polymeric amine suspension agent comprises a polyoxyalkyleneamines, polyvinyl amine, polyalkyleneimine, or polyamides.

39. The mixture of claim 34, wherein the polymeric amine suspension agent is from about 0.05% to about 5.0% by weight of the bituminous material.

40. The mixture of claim 34, further comprising fiber.

\* \* \* \* \*